US012533792B2

United States Patent
Seo et al.

(10) Patent No.: US 12,533,792 B2
(45) Date of Patent: Jan. 27, 2026

(54) BUILDING EXTERIOR WALL CLEANING ROBOT

(71) Applicant: IUCF-HYU (INDUSTRY-UNIVERSITY COOPERATION FOUNDATION HANYANG UNIVERSITY), Seoul (KR)

(72) Inventors: Tae Won Seo, Seoul (KR); Kyung Ook Lee, Seoul (KR); Ho Byeong Chae, Seoul (KR); Ye Cheol Moon, Seoul (KR); Myeong Jin Choi, Seoul (KR); Sa Hoon Ahn, Seoul (KR); Kyoung Wook Lee, Seoul (KR); Kyung Min Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 121 days.

(21) Appl. No.: 18/562,897

(22) PCT Filed: May 9, 2022

(86) PCT No.: PCT/KR2022/006579
§ 371 (c)(1),
(2) Date: Nov. 21, 2023

(87) PCT Pub. No.: WO2022/245031
PCT Pub. Date: Nov. 24, 2022

(65) Prior Publication Data
US 2024/0217092 A1 Jul. 4, 2024

(30) Foreign Application Priority Data

May 21, 2021 (KR) .................. 10-2021-0065790

(51) Int. Cl.
*B25J 5/04* (2006.01)
*A47L 11/38* (2006.01)
(Continued)

(52) U.S. Cl.
CPC .................. *B25J 5/04* (2013.01); *A47L 11/38* (2013.01); *A47L 11/4011* (2013.01); *B25J 11/0085* (2013.01); *A47L 2201/04* (2013.01)

(58) Field of Classification Search
CPC .......... B25J 5/04; B25J 11/0085; A47L 11/38; A47L 11/4011; A47L 2201/04
See application file for complete search history.

(56) References Cited

U.S. PATENT DOCUMENTS

| 5,890,250 A * | 4/1999 | Lange .................. A47L 1/02 15/103 |
| 9,689,170 B1 * | 6/2017 | Lange .................. E04G 23/002 |
| 2022/0120377 A1 * | 4/2022 | Kim .................. B25J 9/104 |

FOREIGN PATENT DOCUMENTS

| JP | 2002-273281 A | 9/2002 |
| JP | 2009-270321 A | 11/2009 |

(Continued)

OTHER PUBLICATIONS

KR 10-2013-0114805, Park et al. translation (Year: 2013).*
International Search Report for PCT/KR2022/006579 dated Aug. 31, 2022.

*Primary Examiner* — Michael E Barr
(74) *Attorney, Agent, or Firm* — Sughrue Mion, PLLC

(57) ABSTRACT

A building exterior wall cleaning robot is disclosed. The building exterior wall cleaning robot comprises: a robot body which cleans a building exterior wall while being suspended on ropes and has a predetermined weight; an LM guide which is coupled to the robot body and provided to have a predetermined length; and a moving unit which is (Continued)

connected to the ropes and moves along the LM guide to move the point on which the tension of the ropes is acting.

4 Claims, 8 Drawing Sheets

(51) Int. Cl.
 *A47L 11/40* (2006.01)
 *B25J 11/00* (2006.01)

(56) References Cited

FOREIGN PATENT DOCUMENTS

| KR | 10-2012-0108888 A | 10/2012 |
|----|-------------------|---------|
| KR | 10-1262934 B1 | 5/2013 |
| KR | 10-2013-0114805 A | 10/2013 |
| KR | 10-2020-0083216 A | 7/2020 |
| KR | 10-2021-0032115 A | 3/2021 |
| KR | 10-2236366 B1 | 4/2021 |

\* cited by examiner

BUILDING EXTERIOR WALL CLEANING ROBOT

CROSS REFERENCE TO RELATED APPLICATIONS

This application is a National Stage of International Application No. PCT/KR2022/006579 filed May 9, 2022, claiming priority based on Korean Patent Application No. 10-2021-0065790 filed May 21, 2021.

TECHNICAL FIELD

The present invention relates to a building exterior wall cleaning robot, and more specifically, to a building exterior wall cleaning robot which can easily pass over an obstacle formed on a building exterior wall.

BACKGROUND ART

In general, workers manually clean external walls or windows of a high building by using ropes or gondolas hanging from external walls or windows of high buildings.

However, as a height of the high-rise building gradually increases and a size of the building also increases considerably, there is a problem that a large number of workers are required and a cleaning area is too large, thereby resulting in an increase of working time and cost.

To solve the problem, various types of cleaning robots have been developed. These cleaning robots need to be stably attached to a building wall surface and to overcome an obstacle on the wall surface. To overcome the obstacle on the wall surface, studies thereof have been attempted using wheels, propellers, and legs.

In order to overcome the obstacle using the wheels, a diameter of the wheel needs be at least twice as large as a height of the obstacle. As a result, a size of the wheel increases according to the height of the obstacle and a size of the cleaning robot increases, thereby causing inconvenience in increasing and operating the manufacturing cost.

When the cleaning robot goes over the obstacle using thrust of the propellers, a distance from the building exterior wall needs to be maintained by the height of the obstacle, and the control of the propellers is required to minimize impact when the cleaning robot makes contact with the building exterior wall. This method requires a very difficult control technique. Moreover, in order for the cleaning robot to completely make close contact with the building exterior wall and maintain a stable posture, a high-power propeller rotation is required, which is a factor that lowers energy efficiency.

When using the legs, a joint or actuator is mainly used, and a considerable number of actuators are required to go over the obstacle. In addition, when using the legs, there is a limitation in that a moving speed is very slow and the energy efficiency is quite poor.

DISCLOSURE

Technical Problem

The present invention provides a building exterior wall cleaning robot which can easily pass over an obstacle on a building exterior wall.

Technical Solution

A building exterior wall cleaning robot according to the present invention includes: a robot body which cleans a building exterior wall while being suspended on ropes and has a predetermined weight; an LM guide which is coupled to the robot body and has a predetermined length; and a moving unit which is connected to the ropes and moves along the LM guide to move a tension acting point of the ropes.

In addition, the building exterior wall cleaning robot may further include: a sensor which senses an obstacle formed on the building exterior wall; and a control unit which controls the moving unit to change a relative position of the tension acting point of the ropes with respect to a center of gravity of the robot body according to a height of the obstacle.

In addition, the moving unit may include: a ball screw arranged in parallel with the LM guide; a ball screw driving unit for rotating the ball screw; a moving body coupled to the ball screw and moving along the LM guide according to rotation of the ball screw; a pulley support unit coupled to the moving body; and a moving pulley rotatably supported by the pulley support unit and wound with the ropes.

In addition, the pulley support unit may be relatively pivotable with respect to the moving body about a rotary shaft which is arranged in parallel to a longitudinal direction of the ball screw.

In addition, the ropes may include a first rope and a second rope, the pulley support unit may include: a first pulley support unit coupled to one side of the moving body and pivotable about a first rotary shaft; and a second pulley support unit coupled to the other side of the moving body and pivotable about a second rotary shaft, and the moving pulley may include: a first moving pulley supported by the first pulley support unit and wound with the first rope; and a second moving pulley supported by the second pulley support unit and wound with the second rope.

Advantageous Effects

According to the present invention, since the front and rear wheels are selectively spaced apart from the building exterior wall according to a position of the moving body, the building exterior wall cleaning robot can easily pass over the obstacle on the building exterior wall.

BEST MODE FOR INVENTION

Figure 1:
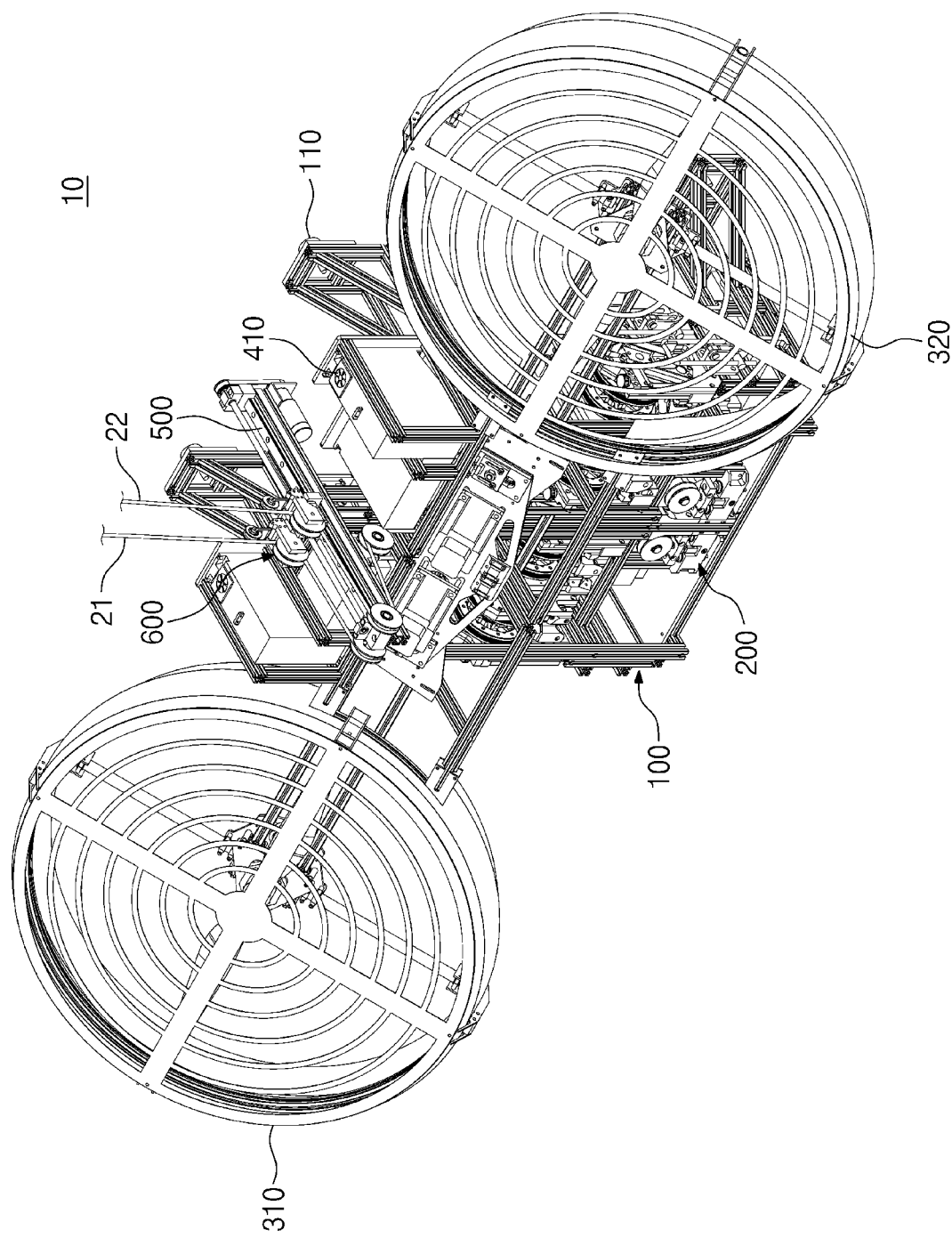
FIG. 1 is a perspective view showing a building exterior wall cleaning robot according to an embodiment of the present invention.

A building exterior wall cleaning robot according to the present invention includes: a robot body which cleans a building exterior wall while being suspended on ropes and has a predetermined weight; an LM guide which is coupled to the robot body and has a predetermined length; and a moving unit which is connected to the ropes and moves along the LM guide to move a tension acting point of the ropes.

MODE FOR INVENTION

Hereinafter, preferred embodiments of the present invention will be described in detail with reference to the accompanying drawings. However, the present invention may be embodied in different forms and should not be construed as limited to the embodiments set forth herein. Rather, the embodiments are provided so that this disclosure will be thorough and complete, and will fully convey the scope of the present invention to those skilled in the art.

In the present specification, it will be understood that when an element is referred to as being "on" another element, it can be formed directly on the other element or intervening elements may be present. In the drawings, the thicknesses of layers and regions are exaggerated for clarity.

In addition, it will be also understood that although the terms first, second, third, etc. may be used herein to describe various elements, these elements should not be limited by these terms. These terms are only used to distinguish one element from another element. Thus, a first element in some embodiments may be termed a second element in other embodiments without departing from the teachings of the present invention. Embodiments explained and illustrated herein include their complementary counterparts. As used herein, the term "and/or" includes any and all combinations of one or more of the associated listed elements.

The singular expression also includes the plural meaning as long as it does not differently mean in the context. In addition, the terms "comprise", "have" etc., of the description are used to indicate that there are features, numbers, steps, elements, or combination thereof, and they should not exclude the possibilities of combination or addition of one or more features, numbers, operations, elements, or a combination thereof. Furthermore, it will be understood that when an element is referred to as being "connected" or "coupled" to another element, may be directly connected or coupled to the other element or intervening elements may be present.

In addition, when detailed descriptions of related known functions or constitutions are considered to unnecessarily cloud the gist of the present invention in describing the present invention below, the detailed descriptions will not be included.

Figure 2:
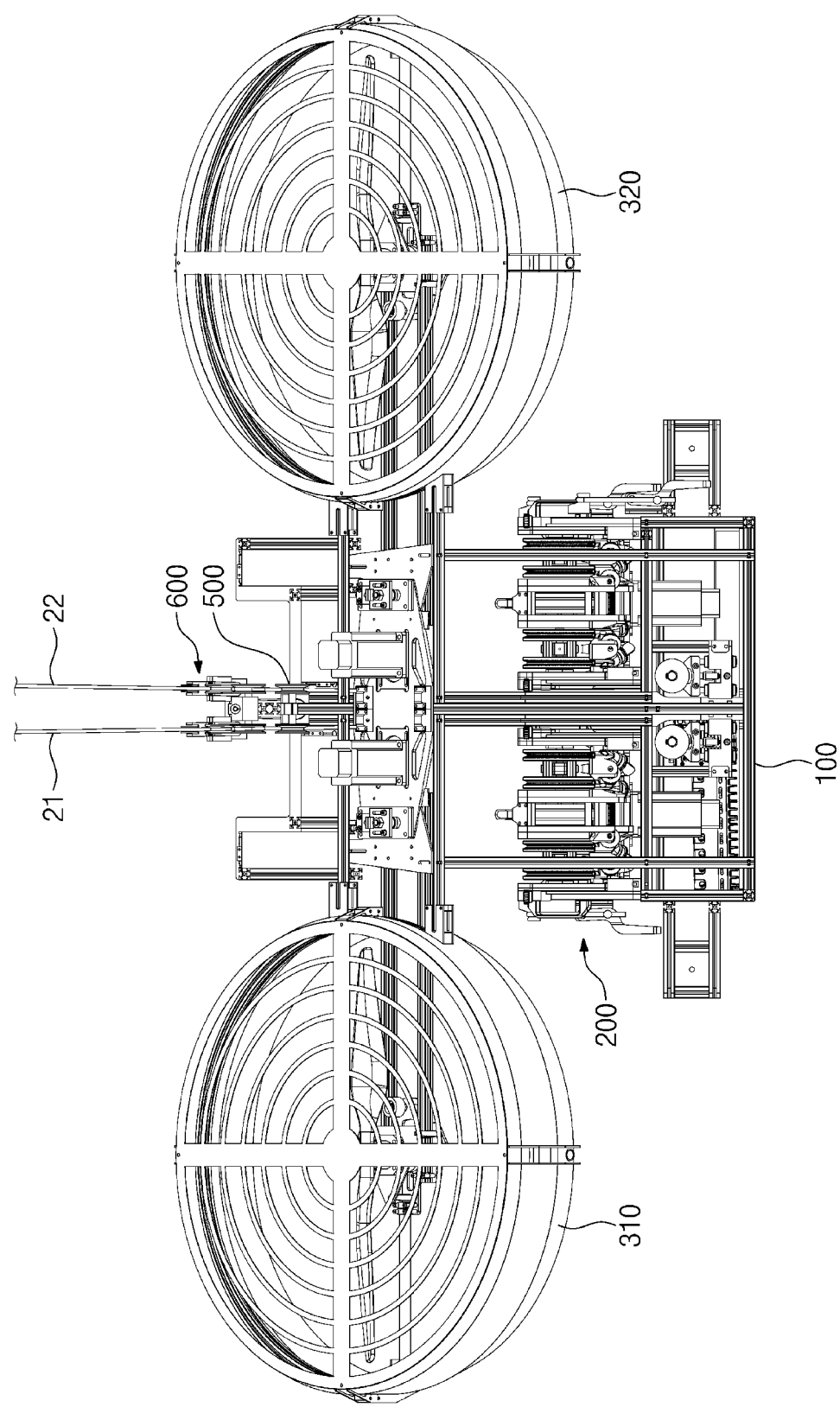
FIG. 2 is a front view showing the building exterior wall cleaning robot of FIG. 1.
Figure 3:
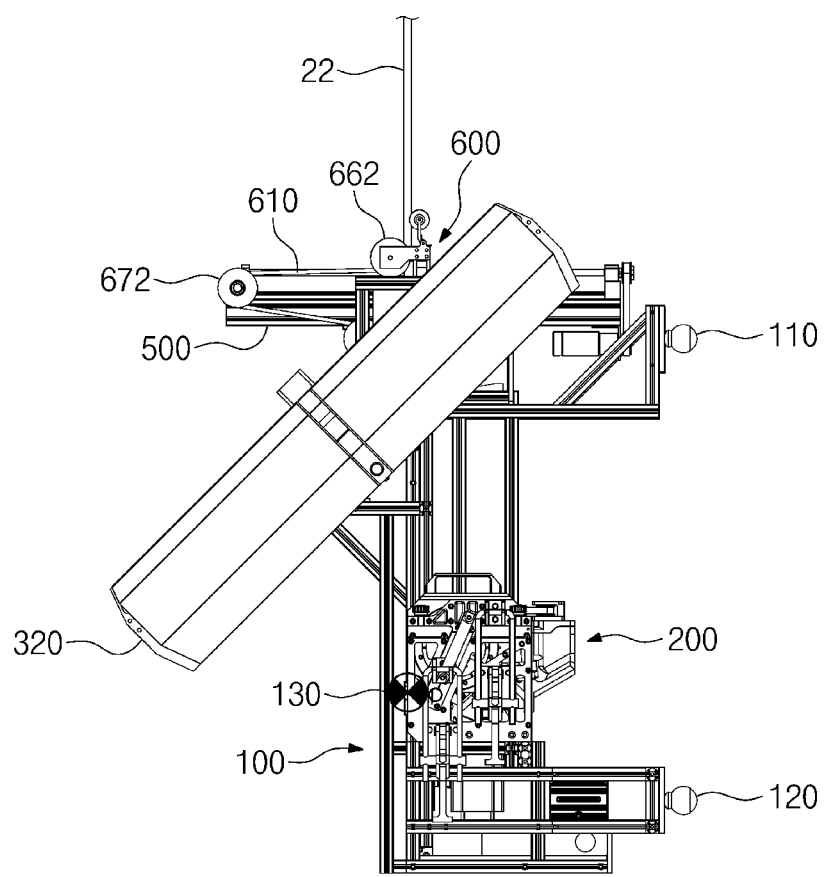
FIG. 3 is a right side view showing the building exterior wall cleaning robot of FIG. 1.

FIG. 1 is a perspective view showing a building exterior wall cleaning robot according to an embodiment of the present invention, FIG. 2 is a front view showing the building exterior wall cleaning robot of FIG. 1, and FIG. 3 is a right side view showing the building exterior wall cleaning robot of FIG. 1.

Referring to FIGS. 1 to 3, a building exterior wall cleaning robot 10 according to the present invention may clean a building exterior wall while being suspended on ropes 21 and 22. Ropes 11 and 12 are provided along the building exterior wall while being fixedly connected to a rooftop of a building. According to the embodiment, two ropes 11 and 12 are provided along the building exterior wall and are connected to the building exterior wall cleaning robot 10.

The building exterior wall cleaning robot 10 includes a robot body 100, a cleaning unit 200, propeller units 310 and 320, a sensor 410, an LM guide 500, a moving unit 600, and a control unit (not shown).

The robot body 100 is a frame having a predetermined weight and supports the above components. An upper wheel 110 and a lower wheel 120 are provided on one side surface of the robot body 100. The upper wheel 110 and the lower wheel 120 support a building wall surface and move while being rolled along the building wall surface.

The cleaning unit 200 is installed on the robot body 100 to clean the building exterior wall. Although not shown in the drawings, the cleaning unit 200 may include a nozzle for spraying water, a rotating brush, a squeeze provided at each of an upper end and a lower end of the rotating brush to prevent the water from splashing to the outside, and a water tray for collecting water used for cleaning.

The propeller units 310 and 320 are provided on both sides of the robot body 100 to generate thrust by high-speed rotation of propellers. The control of thrust may maintain a balance of the building exterior wall cleaning robot 10.

The sensor 410 is installed on the robot body 100 to sense an obstacle formed on the building exterior wall. The sensor 410 may be installed at each of an upper end and a lower end of the robot body 100. The sensor 410 installed at the upper end senses the obstacle on the building exterior wall while the building exterior wall cleaning robot 10 is lifted up. The sensor 410 installed at the lower end senses the obstacle on the building exterior wall while the building exterior wall cleaning robot 10 is lifted down.

Figure 4:
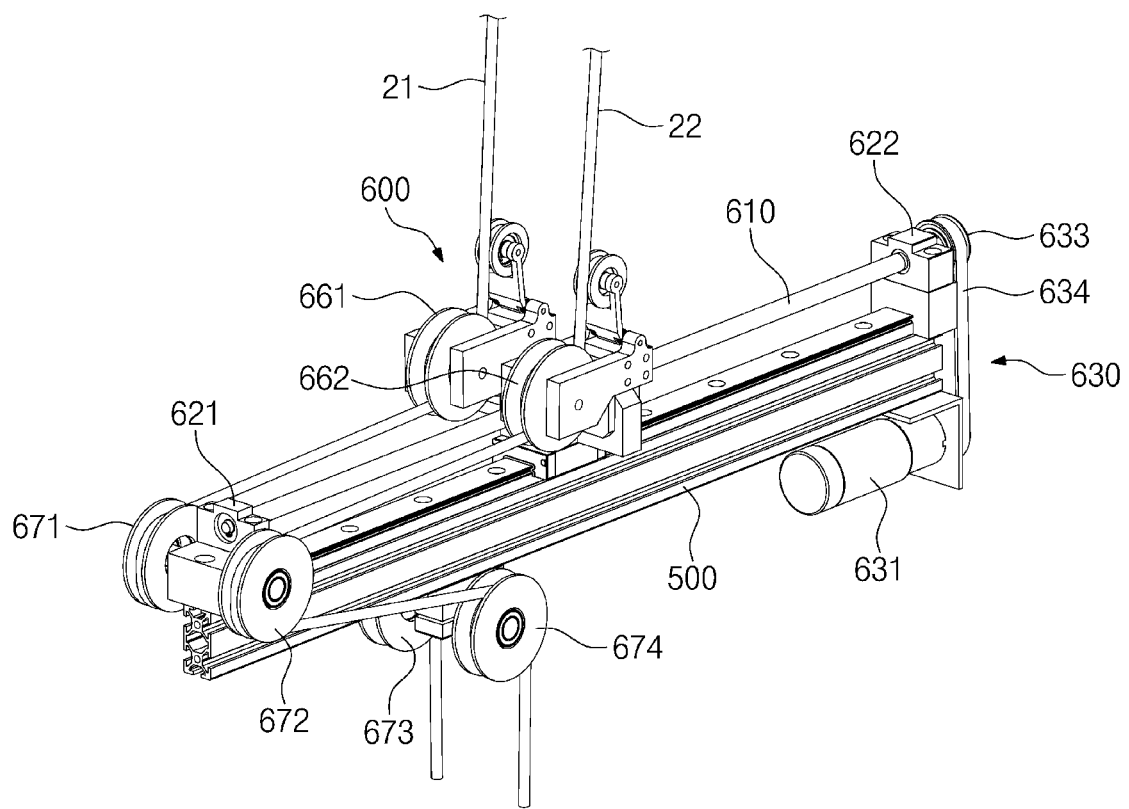
FIGS. 4 and 5 are view showing an LM guide and a moving unit according to the embodiment of the present invention.
Figure 5:
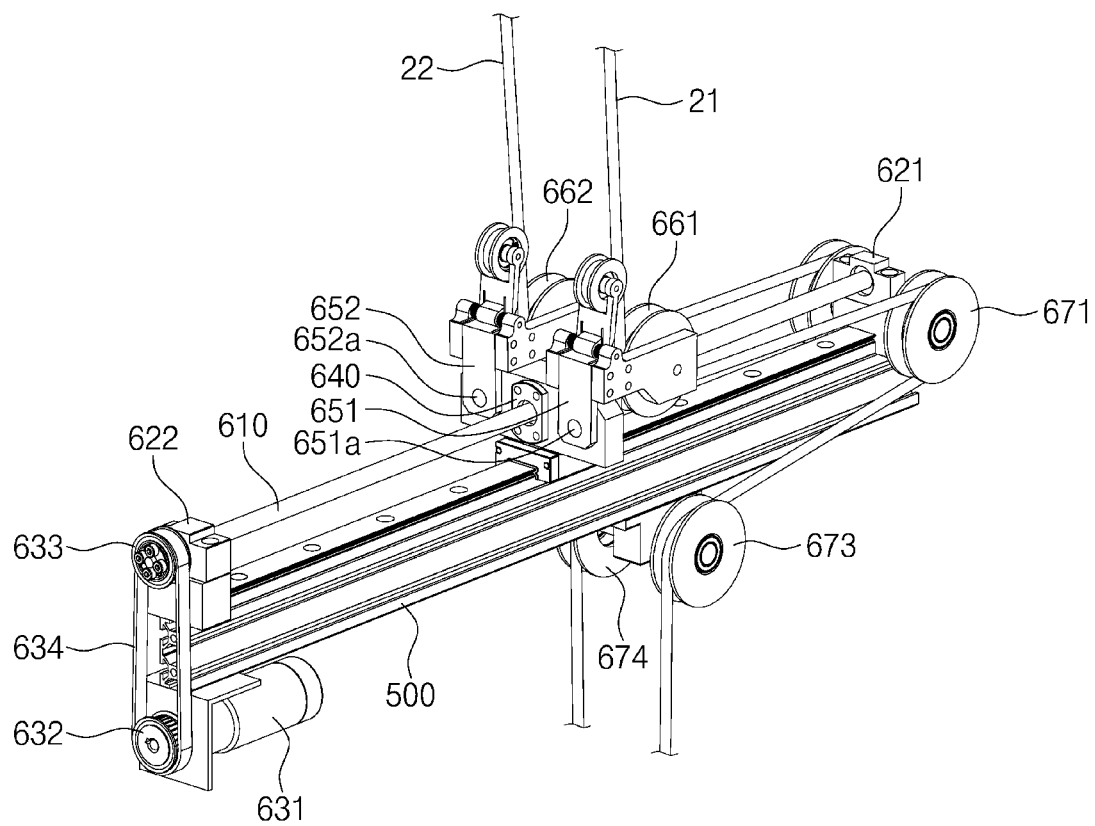

FIGS. 4 and 5 are view showing an LM guide and a moving unit according to the embodiment of the present invention.

Referring to FIGS. 1 to 5, the LM guide 500 has a predetermined length and is coupled to the robot body 100. According to the embodiment, the LM guide 500 is coupled to the upper end of the robot body 100. the LM guide 500 is arranged in a longitudinal direction perpendicular to the building exterior wall. When viewed from the top, a center of gravity 130 of the robot body 100 to which the cleaning unit 200 and the propeller units 310 and 320 are coupled is located within a length range of the LM guide 500.

The moving unit 600 is connected to the ropes 21 and 22 and moves along the LM guide 500. A tension acting point at which tension of the ropes 21 and 22 is applied moves due to the movement of the moving unit 600.

The moving unit 600 includes a ball screw 610, screw supports 621 and 622, a ball screw driving unit 630, a moving body 640, pulley support units 651 and 652, and fixing pulleys 671 to 674.

The ball screw 610 is located above the LM guide 500, and has a length corresponding to a length of the LM guide 500. The ball screw 610 is provided in parallel with the LM guide 500, and is formed on an outer circumferential surface thereof with a screw thread.

A pair of screw supports 621 and 622 are provided and fixedly installed at both ends of the LM guide 500. The screw supports 621 and 622 support the ball screw 610 such that the ball screw 610 may rotate.

The ball screw driving unit 630 rotates the ball screw 610 about a central axis thereof. The ball screw driving unit 630 includes a motor 631, a pair of pulleys 632 and 633, and a belt 634. A driving force generated in the motor 631 is transferred to one pulley 632, and a rotational force of the pulley 632 is transferred to the other pulley 633 through the belt 634, so that the ball screw 610 may rotate.

The moving body 640 has a predetermined shape, and is formed with a through-hole into which the ball screw 610 may be inserted. A screw groove is formed in an inner side surface of the through-hole to engage with the screw thread formed on the outer circumferential surface of the ball screw 610. The moving body 640 may move forward and rearward along the LM guide 500 due to rotation of the ball screw 610.

The pulley support units 651 and 652 are coupled to the moving body 640 so as to relatively pivot with respect to the moving body 640. The pulley support units 651 and 652 are relatively pivotable with respect to the moving body 640 about rotary shafts 651a and 652a arranged in parallel to a longitudinal direction of the ball screw 610. The pulley support units 651 and 652 pivot about the rotary shafts 651a and 652a along a direction in which the ropes 21 and 22 are provided. According to the embodiment, a pair of pulley support units 651 and 65 are provided. A first pulley support unit 651 is coupled to one side of the moving body 640, and a second pulley support unit 652 is coupled to the other side of the moving body 640.

The moving pulleys 661 and 662 are supported by the pulley support units 651 and 652 and wound with the ropes 21 and 22. When viewed from the top, the moving pulleys 661 and 662 are rotatable about rotary shafts vertically arranged in the longitudinal direction of the LM guide 500. According to the embodiment, a pair of moving pulleys 661 and 662 are provided. A first moving pulley 661 is supported by the first pulley support unit 651 and wound with a first rope 21. A second moving pulley 662 is supported by the second pulley support unit 652 and wound with a second rope 22.

The fixing pulleys 671 to 674 are provided at one end and a lower end of the LM guide 500, respectively, and wound with the ropes 21 and 22 extending from the moving pulleys 661 and 662. A pair of fixing pulleys 671 to 674 are provided at one end and a lower end of the LM guide 500, in which one of the fixing pulleys 671 and 673 is wound with the first rope 21 and the other of the fixing pulleys 672 and 674 is wound with the second rope 22. The fixing pulleys 671 to 674 fix the first rope 21 and the second rope 22 to always pass through the same path regardless of the position of the moving body 640.

The control unit controls the moving unit 600 to change a relative position of the tension acting point of the ropes 21 and 22 with respect to the center of gravity 130 of the robot body 100 according to a height of the obstacle sensed by the sensor 410.

Figure 6:
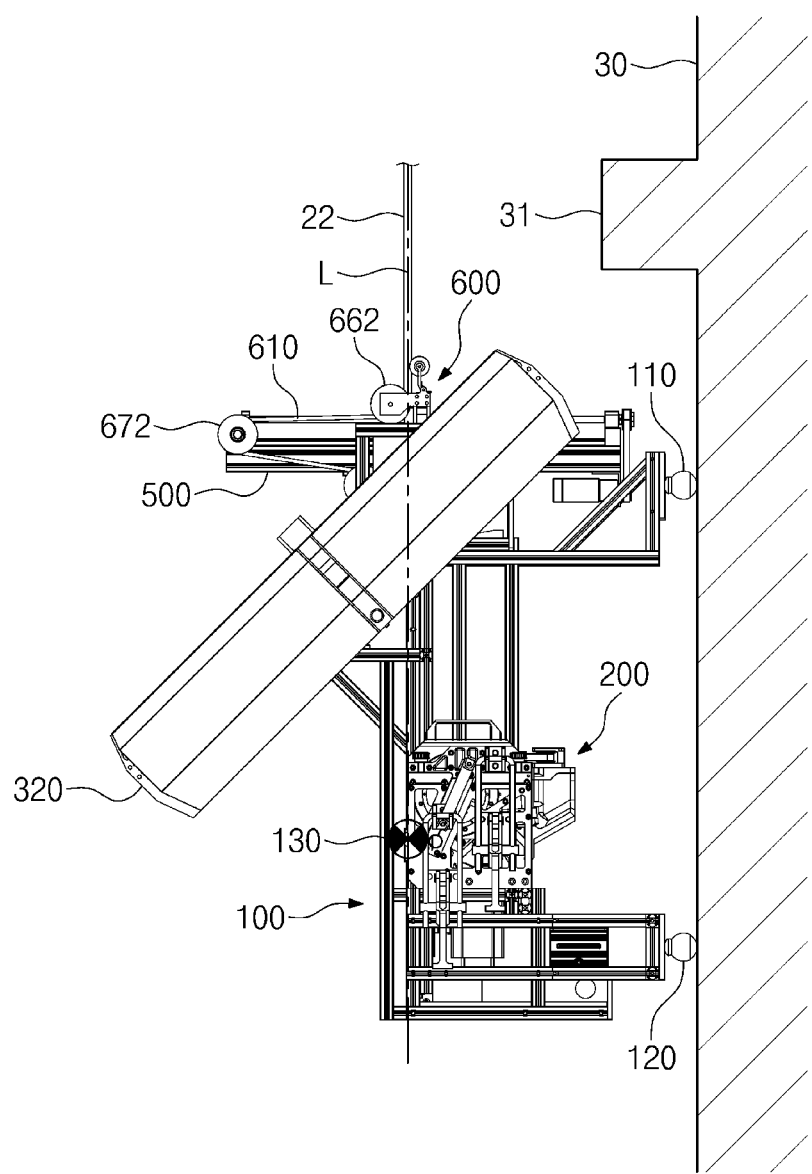
FIGS. 6 to 8 are views sequentially showing a process in which the building exterior wall cleaning robot goes over an obstacle according to the embodiment of the present invention.
Figure 7:
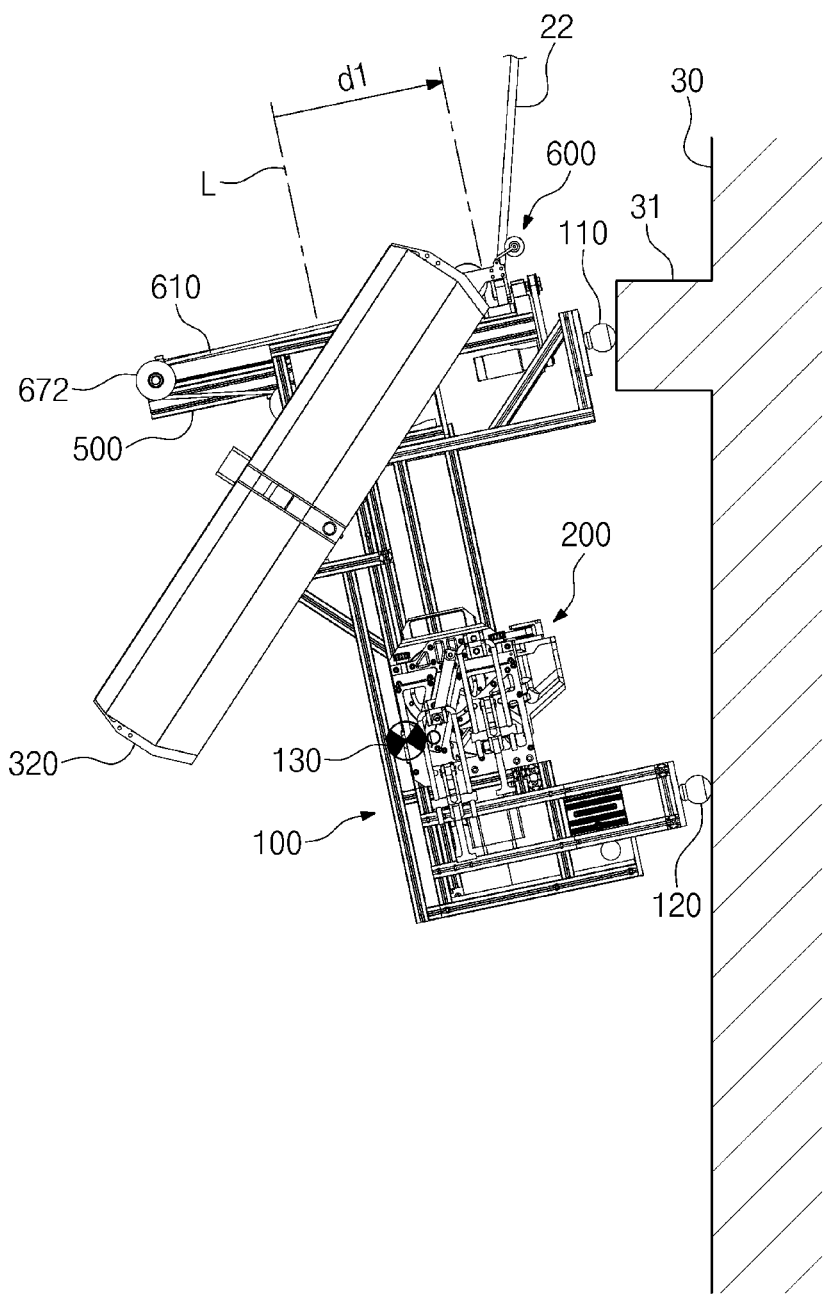
Figure 8:
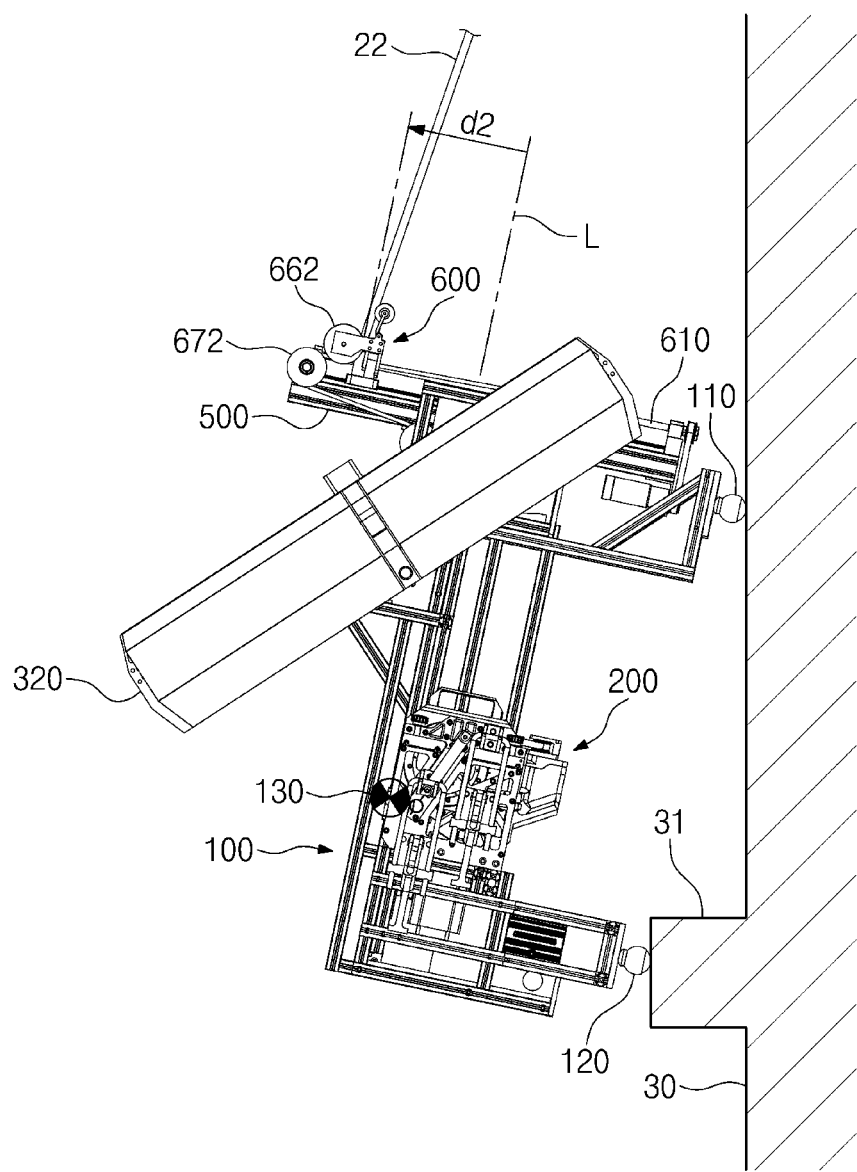

FIGS. 6 to 8 are views sequentially showing a process in which the building exterior wall cleaning robot goes over an obstacle according to the embodiment of the present invention.

Referring to FIG. 6, the moving body 640 is located at a reference point L of the LM guide 500. The reference point L is a point located collinearly with the center of gravity 130. When the moving body 640 is located at the reference point, the upper wheel 110 and the lower wheel 120 are supported by a building wall surface 30.

Referring to FIG. 7, when an obstacle 31 is sensed by the sensor 410, the control unit moves a position of the moving body 640 according to the height of the obstacle 31. Specifically, the ball screw 610 rotates in one direction due to driving of the ball screw driving unit 630, so that the moving body 640 moves forward along the LM guide 500. When the moving body 640 is located in front of the reference point L, the front wheel 110 is spaced apart from the building exterior wall 30 by a distance d1 between the reference point L and the moving body 640. Therefore, the front wheel 110 may pass through the obstacle 31.

Referring to FIG. 8, when the ball screw 610 rotates in an opposite direction due to driving of the ball screw driving unit 630, the moving body 640 moves rearward along the LM guide 500. When the moving body 640 is located in rear of the reference point L, the rear wheel 120 is spaced apart from the exterior wall 30 by a distance d2 between the building reference point L and the moving body 640. Therefore, the rear wheel 120 may pass over the obstacle 31.

As described above, in the building exterior wall cleaning robot 10 according to the present invention, the front wheel 110 and the rear wheel 120 may be selectively spaced apart from the building exterior wall 30 according to the position of the moving body 640. Thus, the building exterior wall cleaning robot 10 can easily pass over the obstacle 31 on the building exterior wall.

While the present invention has been described in connection with the embodiments, it is not to be limited thereto but will be defined by the appended claims. In addition, it is to be understood that those skilled in the art can substitute, change or modify the embodiments in various forms without departing from the scope and spirit of the present invention.

INDUSTRIAL APPLICABILITY

The building exterior wall cleaning robot according to the present invention can be used to clean the exterior wall or the window of a high-rise building.

The invention claimed is:

1. A building exterior wall cleaning robot which cleans a building exterior wall while being suspended on ropes, the building exterior wall cleaning robot comprising:
   a robot body having a predetermined weight;
   a linear motion guide which is coupled to the robot body and has a predetermined length;
   a moving unit which is connected to the ropes and moves along the linear motion guide to move a tension acting point of the ropes;
   a sensor which senses an obstacle formed on the building exterior wall; and
   a control unit which controls the moving unit to change a relative position of the tension acting point of the ropes with respect to a center of gravity of the robot body according to a height of the obstacle.

2. The building exterior wall cleaning robot of claim 1, wherein the moving unit includes:
   a ball screw arranged in parallel with the linear motion guide;
   a ball screw driving unit for rotating the ball screw;
   a moving body coupled to the ball screw and moving along the linear motion guide according to rotation of the ball screw;
   a pulley support unit coupled to the moving body; and
   a moving pulley rotatably supported by the pulley support unit and wound with the ropes.

3. The building exterior wall cleaning robot of claim 2, wherein the pulley support unit is relatively pivotable with respect to the moving body about a rotary shaft which is arranged in parallel to a longitudinal direction of the ball screw.

4. The building exterior wall cleaning robot of claim 2, wherein the ropes include a first rope and a second rope,
   wherein the pulley support unit includes:
   a first pulley support unit coupled to one side of the moving body and pivotable about a first rotary shaft; and
   a second pulley support unit coupled to an opposite side of the moving body and pivotable about a second rotary shaft, and
   wherein the moving pulley includes:

a first moving pulley supported by the first pulley support unit and wound with the first rope; and a second moving pulley supported by the second pulley support unit and wound with the second rope.

* * * * *